United States Patent [19]
Szeverenyi

[11] 3,882,479
[45] May 6, 1975

[54] THERMALLY EXPANSIVE SENSOR

[75] Inventor: Nikolaus A. Szeverenyi, Warren, Pa.

[73] Assignee: GTE Sylvania Incorporated, Stamford, Conn.

[22] Filed: Jan. 23, 1974

[21] Appl. No.: 435,663

[52] U.S. Cl............ 340/244 R; 337/324; 337/327
[51] Int. Cl. .......................................... G08b 21/00
[58] Field of Search ........ 340/244 R, 244 A, 244 B, 340/244 C, 244 D, 244 E, 366 B, 366 D; 337/324, 332, 337

[56] References Cited
UNITED STATES PATENTS
| | | | |
|---|---|---|---|
| 3,171,934 | 3/1965 | Brennan............................ | 200/138 |
| 3,335,243 | 8/1967 | Canaday ........................ | 340/244 R |
| 3,813,629 | 5/1974 | Szeverenyi et al.................. | 337/324 |

Primary Examiner—Thomas B. Habecker
Assistant Examiner—James Groody
Attorney, Agent, or Firm—Norman J. O'Malley; Donald R. Castle; Lawrence R. Fraley

[57] ABSTRACT

A fluid sensor device is disclosed which comprises the housing member, a heat responsive tip member adapted for thermally expanding in a predetermined direction, a heat responsive means fixedly positioned relative to said tip member and adapted for thermally expanding in a direction different from that of said tip member, and a heater means for heating said tip member and said heat responsive means. A fluid sensing apparatus is also disclosed which comprises in one embodiment the above described sensor device and an electrical circuit which includes a source of electrical potential operatively connected to the heater means of the sensor. Another embodiment of a sensing apparatus is also disclosed which includes the above described sensor and a first electrical circuit which includes a source of electrical potential connected to the heater means and a second electrical circuit which includes a current indicating means operatively connected to the source of electrical potential for indicating electrical current through the second circuit when the heat responsive means thermally expands at a rate greater than the tip member.

15 Claims, 3 Drawing Figures

THERMALLY EXPANSIVE SENSOR

BACKGROUND OF THE INVENTION

This invention relates to fluid sensing apparatus and more particularly to such devices which include thermally expansive material.

Sensing apparatus of the variety described above have most usually been of a relatively complex nature, requiring and utilizing several components in order to successfully function. As can be appreciated, this requirement has resulted in added complexity to their method of operation as well as increased costs of their manufacture.

Those typically known in the art have utilized an expandable material such as wax or similar composition which expanded to actuate a corresponding piston or similar member. Still further examples of such fluid sensing devices have incorporated the use of a single heat responsive shell or similar cylindrical member which expanded in a given direction when the temperature of the fluid about this member either increased or decreased. While both of the described examples performed their functions relatively well, they were either unable to compensate for varying ambient conditions or if able to do so, required such complex circuitry or design that the cost for manufacturing such devices was exceptionally high.

OBJECTS AND SUMMARY OF THE INVENTION

It is therefore a primary object of this invention to provide a new and unique fluid sensing device.

It is another object of this invention to provide such a device which is relatively simple in operation as well as inexpensive to manufacture.

It is another object of this invention to provide a fluid sensing device of the nature described which is able to compensate for varying ambient conditions.

In accordance with one aspect of this invention, there is provided a fluid sensor device which comprises a housing member, a heat responsive tip member secured to the housing and adapted for thermally expanding in a predetermined direction, a heat responsive means fixedly positioned relative to the tip member and adapted for thermally expanding in a direction substantially different from that of the tip member at a rate greater than said expansion of the tip member only when the temperature difference between the tip member and the heat responsive means exceeds a preestablished level, and a heater means for heating both tip member and heat responsive means.

In accordance with another aspect of this invention, a fluid sensing apparatus is provided which comprises the previously described sensor device and an electircal circuit which includes a source of electrical potential operatively connected to the described heater means of the sensor device.

In accordance with still another aspect of this invention, there is provided a fluid sensing apparatus which comprises the previously described sensor device, a first electrical circuit which includes a source of electrical potential operatively connected to the heater means of the sensor device, and a second electrical circuit which includes a current indicating means operatively connected to the source of electrical potential and for indicating electrical current through the second circuit only when the heat responsive means thermally expands at a rate greater than that of the tip member.

DESCRIPTION OF THE PREFERRED EMBODIMENTS

For a better understanding of the present invention together with other and further objects, advantages and capabilities thereof, reference is made to the following disclosure and appended claims in connection with the above-described drawings.

Figure 1:
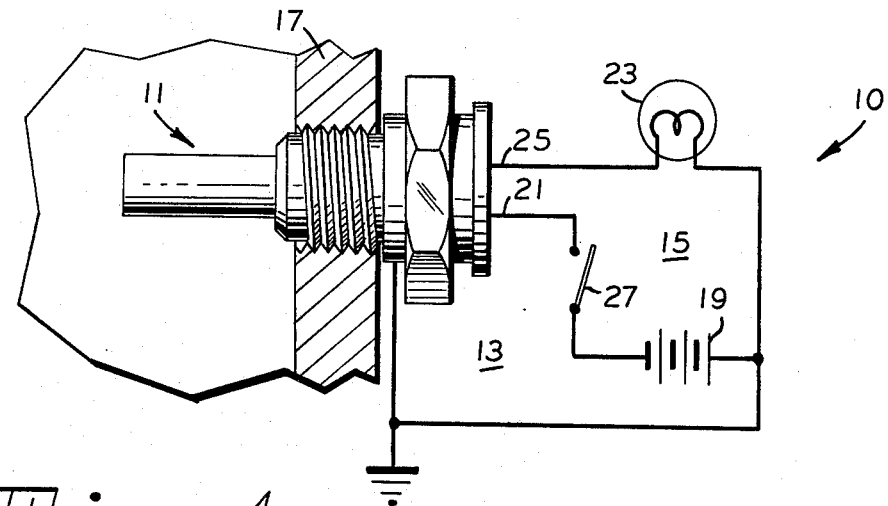
FIG. 1 is a side elevational view of a sensing apparatus in accordance with one embodiment of the present invention.

With reference to the drawings, there is illustrated in FIG. 1 a sensing apparatus in accordance with a preferred embodiment of the present invention. Sensing apparatus 10 is shown to comprise a sensor device 11, a first electrical circuit 13, and a second electrical circuit 15. Sensor device 11 is adapted for being secured within a container wall 17 in the manner indicated. It is to be understood, however, that sensor device 11 could be affixed within wall 17 in a different manner such as by welding, soldering, etc. The present method, utilizing screw threads, is preferred to facilitate removal of the sensor device in the event of damage. First electrical circuit 13 is shown to comprise a source of electrical potential, illustrated as battery 19, which is operatively connected to sensor device 11 via a first lead 21. Second electrical circuit 15, shown to include a current indicating means, illustrated as bulb 23, is operatively connected to battery 19 and sensor device 11. Second lead 25 connects bulb 23 to sensor device 11. A more detailed illustration of how first and second leads 21 and 25 are connected to sensor device is shown in FIGS. 2 and 3.

As shown in FIG. 1, sensor device 11 is also connected to ground. However, should container wall 17 be of metallic composition or of another material able to conduct electrical current, the wall itself could be connected to ground. A switch 27 is also included within first circuit 13 to provide a means for opening and closing this circuit.

Figure 2:
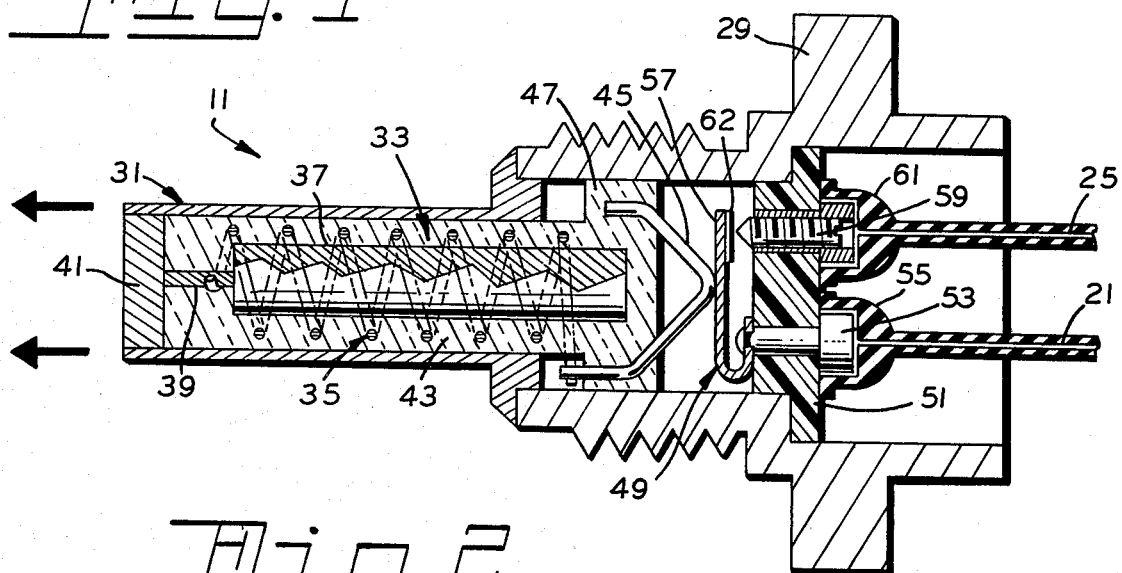
FIG. 2 is a side elevational view, in section, of the sensor device in accordance with a preferred embodiment of the present invention.
Figure 3:
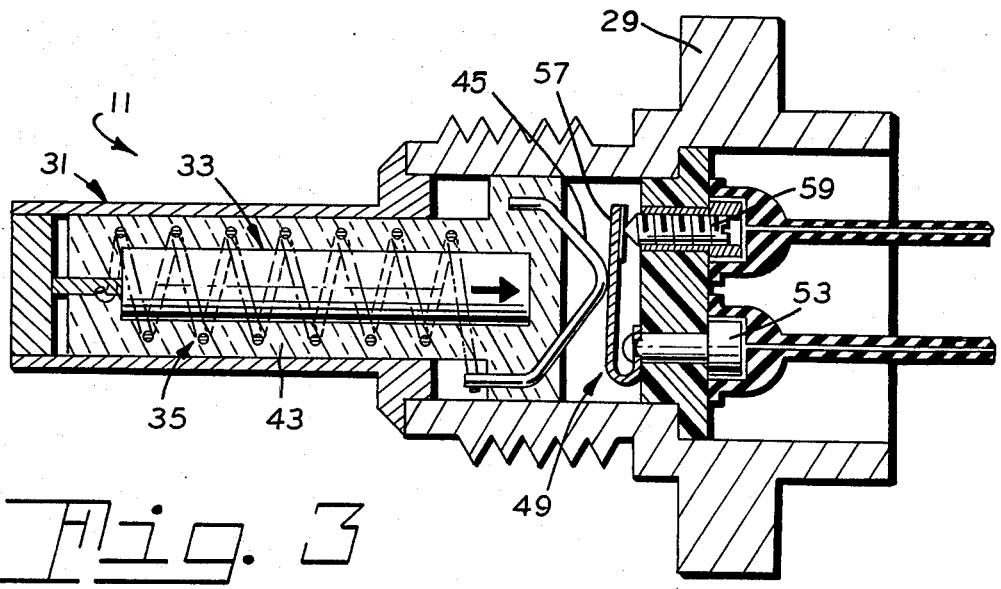
FIG. 3 illustrates the relative position of the internal components of the sensor device of FIG. 2 during activation of the sensor device.

With particular reference to FIG. 2, a more detailed view of sensor device 11 is shown. Sensor device 11 comprises a housing member 29, a heat responsive tip member 31, a heat responsive means 33, and a heater means 35. As shown, heat responsive tip member 31 is secured to housing 29 and is adapted for thermally expanding in a predetermined first direction, such as is illustrated by the directional arrow in FIG. 2. Heat responsive means 33, on the other hand, is fixedly positioned relative to tip member 31 and is adapted for thermally expanding in a second direction substantially different from that of the tip member. This direction of expansion is indicated by the directional arrow in FIG. 3 and is illustrated as substantially opposing the predescribed direction of expansion of tip member 31. Heat responsive means 33, illustrated as being substantially elongated in form, comprises a central member 37, a neck portion 39 and a base portion 41. Base portion 41 is fixedly positioned to tip 31 utilizing any of the conventional securing methods, such as soldering or welding. Central member 37 of heat responsive means 33 is positioned substantially within an electrically insulative material 43 which also exhibits the desired property of being a good thermal conductor. Heater means 35, preferably comprising an electrical resistive element in the form of a coil, is also positioned within material 43 and substantially about central member 37 in the manner indicated. One end of heater means 33 is engaged about neck portion 39 of heat responsive means 33 while the other end is fixedly engaged to elbow member 45. Elbow member 45 is positioned in the manner indicated in flanged portion 47 of electrically insulative material 43 with its elbow portion extending from the flanged portion to be in continuous engagement with a contact spring member 49. Contact spring 49 is retained against a second electrically insulative material 51 utilizing a retention contact member 53. As shown, contact member is adapted for having an end plug 55 connected thereto, end plug 55 comprising the end of first lead 21 of first electrical circuit 13. Positioned substantially adjacent end 57 of contact spring 49 is an adjustable contact means 59. Contact means 59 is threaded into insulative material 51 and provides the electrical connection to second lead 25 of second circuit 15 by utilizing a second end plug 61.

In manufacturing the described sensor device, it is preferred to utilize the same heat responsive materials for both tip member 31 and heat responsive means 33. In the preferred embodiment, this material is naval brass, although it is understood that practically any of the high thermal expansion materials could be successfully utilized. Housing 29 is preferably manufactured utilizing stainless steel or a similar material able to withstand a possible corrosive environment to which sensor device 11 may be subjected. Glass is the preferred material for insulative material 43, although practically any of the good thermal conducting materials possessing the additional property of being electrically insulative will suffice. The preferred material for electrically insulative material 51 is sold under the trade name "Synthane" and may be purchased from the Synthane-Taylor Corporation of Valley Forge, Pa. Practically any electrically insulative material could be utilized, however. Elbow member 45 and contact spring 49 are both preferably of a stainless steel or similar type metallic composition. To insure a sound electrical connection between end 57 of contact spring 49 and the adjustable contact 59, it is preferred to provide end 57 with a quantity of a good electrically conductive material 62 such as copper, or a gold alloy or silver alloy composition. This material is secured utilizing conventional methods such as welding or soldering in the manner indicated.

In operation, when switch 27 in first circuit 13 is closed electrical current will pass from battery 19 through first lead 21, contact member 53, contact spring 49, elbow member 45, heater means 35, tip member 31, housing 29, and back to battery 19. This path of current flow is readily shown in FIG. 2. With electrical current passing through heater means 35, this means serves to provide heat in both tip member 31 and heat responsive means 33. With no external cooling means, such as would be provided by a fluid substantially about tip 31, both the heat responsive tip member 31 and the heat responsive means 33 will thermally expand in their respective directions at a substantially equal rate. Should fluid or any similar type cooling medium be present about tip 31, an unequal balance in the described rates of heat dissipation will occur. More particularly, tip member 31 will now be cooled at a substantially greater rate. The result of such cooling is that now heat responsive means 33 will thermally expand at a rate greater than the thermal expansion of tip 31 as a result of the temperature difference between the two respective members. As illustrated in FIG. 3, this unequal rate of expansion results in the electrically insulative material 43 being moved in a direction substantially toward contact spring 49. Elbow portion 45 thus serves to depress contact spring 49 to thereby engage adjustable contact 59 which now results in the current indicating means 23 being operatively connected to battery 19. As can be appreciated, electrical current flowing through indicating means 23 activates this means to indicate to an operator that a fluid medium is now about tip 31 of the sensor device.

Sensor device 11 will operate in the manner indicated regardless of the temperature of the fluid medium being detected. As can be appreciated, this unique property permits the usage of sensor device 11 in a wide variety of functions. One particularly well known use for sensor 11 would be in a water boiler system wherein the device could be used to detect an undesired high level of the water in the boiler container. Furthermore, by incorporating only slight modification to adjustable contact 59, sensor 11 could readily be utilized to detect an undesired low level of fluid within a container.

Thus, there has been illustrated and described a sensing apparatus which is able to sense the presence or absence of a fluid medium about its tip member. This apparatus is relatively inexpensive to manufacture and is comparatively easy to operate. It is additionally able to compensate for varying ambient conditions of the medium being detected.

While there have been shown and described what are at present considered the preferred embodiments of the invention, it will be obvious to those skilled in the art that various changes and modifications may be made therein without departing from the scope of the invention as defined by the appended claims.

What is claimed is:

1. A fluid sensor device comprising:
a housing member;
a heat responsive tip member secured to said housing for being exposed to a fluid and for thermally expanding in a first direction;
a substantially elongated solid heat responsive member positioned substantially within said sensor device and fixedly positioned relative to said heat responsive tip member for thermally expanding in a second direction opposing said first direction of expansion of said tip member; and
heater means positioned within said sensor device and relative to said tip member and said elongated heat responsive member for heating said tip member and said elongated heat responsive member to cause said tip member to thermally expand in said first direction and said elongated heat responsive member to expand in said second direction, said elongated heat responsive member expanding greater than said tip member only when the temperature of said elongated heat responsive member exceeds the temperature of said tip member, said greater expansion occuring only when said tip member is exposed to said fluid.

2. The fluid sensor device according to claim 1 wherein said heater means is an electrical resistive element.

3. The sensor device according to claim 1 wherein said tip member is electrically conductive.

4. The sensor device according to claim 1 wherein said tip member and said heat responsive member are comprised of substantially the same material.

5. The sensor device according to claim 4 wherein said material for said heat responsive member and said tip member is naval brass.

6. A fluid sensing apparatus comprising:
a sensor device including a housing member, a heat responsive tipi member secured to said housing for being exposed to a fluid and for thermally expanding in a first direction, a substantially elongated solid heat responsive member positioned substantially within said sensor device and fixedly positioned relative to said heat responsive tip member for thermally expanding in a second direction opposing said first direction of expansion of said tip member, and heater means positioned within said sensor device and relative to said tip member and said elongated heat responsive member for heating said tip member and said elongated heat responsive member to cause said tip member to thermally expand in said first direction and said elongated heat responsive member to expand in said second direction, said elongated heat responsive member expanding greater than said tip member only when the temperature of said elongated heat responsive member exceeds the temperature of said tip member, said greater expansion occurring only when said tip member is exposed to said fluid; and
an electrical circuit including a source of electrical potential operatively connected to said heater means.

7. The fluid sensing apparatus according to claim 2 wherein said heater means is an electrical resistive element.

8. The fluid sensing apparatus according to claim 2 wherein said tip member is electrically conductive and is operatively connected to said source of electrical potential and said heater means.

9. The fluid sensing apparatus according to claim 2 wherein said heat responsive member and said tip member are comprised of substantially the same material.

10. The fluid sensing apparatus according to claim 9 wherein said material for said heat responsive member and said tip member is naval brass.

11. A fluid sensing apparatus comprising:
a sensor device including a housing member, a heat responsive tip member secured to said housing for being exposed to a fluid and for thermally expanding in a first direction, a substantially elongated solid heat responsive member positioned substantially within said sensor device and fixedly positioned relative to said heat responsive tip member for thermally expanding in a second direction opposing said first direction of expansion of said tip member, and heater means positioned within said sensor device and relative to said tip member and said elongated heat responsive member for heating said tip member and said elongated heat responsive member to cause said tip member to thermally expand in said first direction and said elongated heat responsive member to expand in said second direction, said elongated heat responsive member expanding greater than said tip member only when the temperature of said elongated heat responsive member exceeds the temperature of said tip member, said greater expansion occurring only when said tip member is exposed to said fluid;
a first electrical circuit including a source of electrical potential operatively connected to said heater means; and
second electrical circuit means including a current indicating means and an electrical contact spring member operatively connected to said source of electrical potential for connecting electrical current through said second electrical circuit means when said elongated heat responsive member thermally expands greater than said tip member and moves said electrical contact spring member.

12. The fluid sensing apparatus according to claim 11 wherein said heater means is an electrical resistive element operatively connected to said source of electrical potential.

13. The fluid sensing apparatus according to claim 11 wherein said tip member is electrically conductive and is operatively connected to said source of electrical potential and said heater means.

14. The sensing apparatus according to claim 11 wherein said heat responsive member and said tip member are comprised of substantially the same material.

15. The sensing apparatus according to claim 14 wherein said material for said heat responsive member and said tip member is naval brass.

* * * * *